United States Patent [19]
Bell et al.

[11] Patent Number: 5,989,143
[45] Date of Patent: Nov. 23, 1999

[54] ARRANGEMENT FOR LUBRICATING A DIFFERENTIAL ASSEMBLY OF A WORK MACHINE

[75] Inventors: Douglas W. Bell, Mattoon; David Hinton, Mt. Zion, both of Ill.

[73] Assignee: Caterpillar Inc., Peoria, Ill.

[21] Appl. No.: 09/162,214

[22] Filed: Sep. 28, 1998

[51] Int. Cl.$^6$ .................................................. F16H 97/04
[52] U.S. Cl. ........................ 475/160; 184/6.12; 184/11.2
[58] Field of Search .................................. 475/159, 160; 184/6.12, 11.2

[56] References Cited

PUBLICATIONS

The Timken Company Publication Untitled published 1984.

*Primary Examiner*—Khoi Q. Ta
*Attorney, Agent, or Firm*—Bradford G. Addison; Maginot, Addison & Moore

[57] ABSTRACT

A differential assembly which includes a differential housing is disclosed. The differential housing defines an internal component chamber, a fluid housing inlet, and a fluid housing outlet. The differential assembly also includes a spider structure positioned within the internal component chamber. The spider structure has (i) a spider hub and (ii) a spider shaft which extends from the spider hub. The differential assembly further includes a pinion gear positioned within the internal component chamber and around the spider shaft. The differential assembly also includes a bearing assembly positioned within the internal component chamber. The bearing assembly is interposed between the pinion gear and the spider shaft, wherein (i) the spider structure has a fluid spider channel having a fluid spider inlet and a fluid spider outlet, (ii) the fluid housing inlet is in fluid communication with the fluid spider inlet, and (iii) the fluid spider outlet is in fluid communication with the fluid housing outlet. The differential assembly also includes a fluid pump which advances a flow of oil through the fluid housing inlet, the fluid spider inlet, the fluid spider outlet, and the fluid housing outlet.

19 Claims, 2 Drawing Sheets

ARRANGEMENT FOR LUBRICATING A DIFFERENTIAL ASSEMBLY OF A WORK MACHINE

TECHNICAL FIELD OF THE INVENTION

The present invention relates generally to a differential assembly of a work machine, and more particularly to an arrangement for lubricating a differential assembly of a work machine.

BACKGROUND OF THE INVENTION

Work machines, such as mining trucks, typically include a left axle, a right axle, and a differential assembly which mechanically couples the right and left axle. The differential assembly allows the right and left axles to rotate at different speeds relative to one another as the work machine is driven in a curved path.

The differential assembly includes a number of components such as side gears, pinion gears, and bearing assemblies which are contained within a housing. The housing is mounted on a pair of exterior bearing assemblies which allow the housing to rotate when the differential assembly is utilized, i.e. when the work machine is driven in a curved path.

Adequate lubrication of the aforementioned components (e.g. the bearing assemblies) is an important factor in maintaining the proper operation of the differential assembly. Typically, "splash lubrication" is utilized to lubricate the components of the differential assembly. "Splash lubrication" involves transferring oil from a static oil bath located on the exterior of the housing into the interior of the housing through channels defined in the side walls of the housing. Specifically, as the housing is rotated, a portion thereof is dipped into the static oil bath. As the housing is dipped into the static oil bath, oil is transferred therefrom into the interior of the housing via the channels defined in the side walls of the housing. Once located within the housing the oil can lubricate and cool the components contained therein.

Components located exterior to the housing are also typically lubricated with "splash lubrication". However, in some situations "splash lubrication" will not adequately lubricate these components. In these situations a lube jet is typically located adjacent to the component to be lubricated. These lube jets spray oil onto the component thereby lubricating the same.

A problem with the above described arrangement is that under certain conditions the rotation of the housing generates enough centrifugal force such that oil is forced from the interior of the housing, through the channels, and back into the static oil bath. Therefore, under these conditions, the components contained within the housing are essentially being run without any lubrication. Running the components without lubrication is detrimental to the differential assembly. Another problem with the above described arrangement is that positioning stationary lube jets adjacent to various components exterior to housing is difficult and costly and thus adds to the manufacturing costs of the work machine.

What is needed therefore an arrangement for lubricating a differential assembly of a work machine which overcomes one or more of the above-mentioned drawbacks.

DISCLOSURE OF THE INVENTION

In accordance with a first embodiment of the present invention, there is provided a differential assembly which includes a differential housing. The differential housing defines an internal component chamber, a fluid housing inlet, and a fluid housing outlet. The differential assembly also includes a spider structure positioned within the internal component chamber. The spider structure has (i) a spider hub and (ii) a spider shaft which extends from the spider hub. The differential assembly further includes a pinion gear positioned within the internal component chamber and around the spider shaft. The differential assembly also includes a bearing assembly positioned within the internal component chamber. The bearing assembly is interposed between the pinion gear and the spider shaft, wherein (i) the spider structure has a fluid spider channel having a fluid spider inlet and a fluid spider outlet, (ii) the fluid housing inlet is in fluid communication with the fluid spider inlet, and (iii) the fluid spider outlet is in fluid communication with the fluid housing outlet.

In accordance with a second embodiment of the present invention, there is provided a differential assembly which includes a differential housing. The differential housing defines an internal component chamber, a fluid housing inlet, and a fluid housing outlet. The differential assembly also includes a spider structure positioned within the internal component chamber. The spider structure has (i) a spider hub and (ii) a spider shaft which extends from the spider hub. The differential assembly further includes a pinion gear positioned within the internal 10 component chamber and around the spider shaft. The differential assembly also includes a bearing assembly positioned within the internal component chamber. The bearing assembly is interposed between the pinion gear and the spider shaft, wherein (i) the spider structure is has a fluid spider channel having a fluid spider inlet and a fluid spider outlet, (ii) the fluid housing inlet is in fluid communication with the fluid spider inlet, and (iii) the fluid spider outlet is in fluid communication with the fluid housing outlet. The differential assembly also includes a fluid pump which advances a flow of oil through the fluid housing inlet, the fluid spider inlet, the fluid spider outlet, and the fluid housing outlet.

BEST MODE FOR CARRYING OUT THE INVENTION

Figure 1:
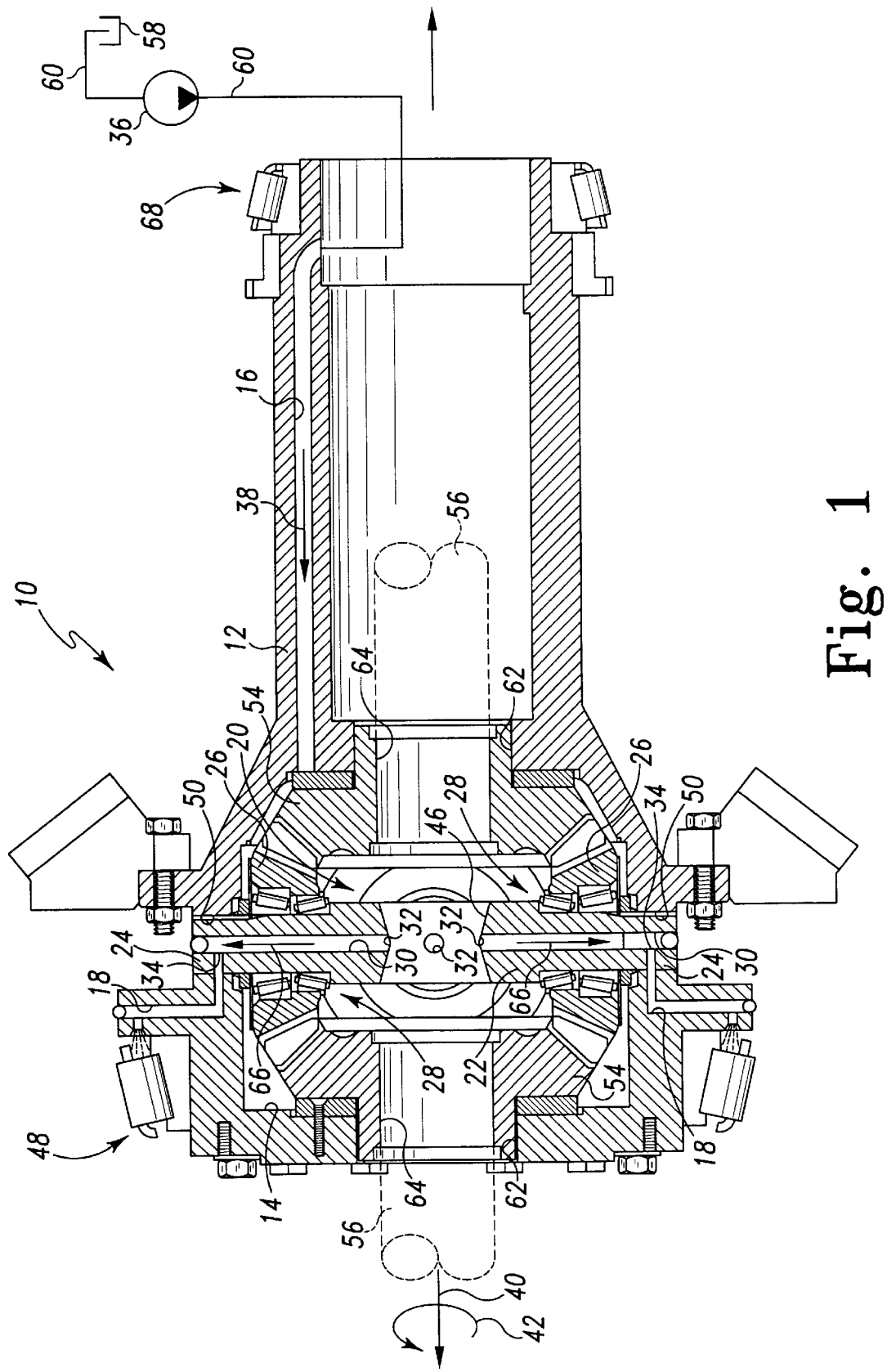
FIG. 1 is a partial schematic, partial cross sectional view of a differential assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
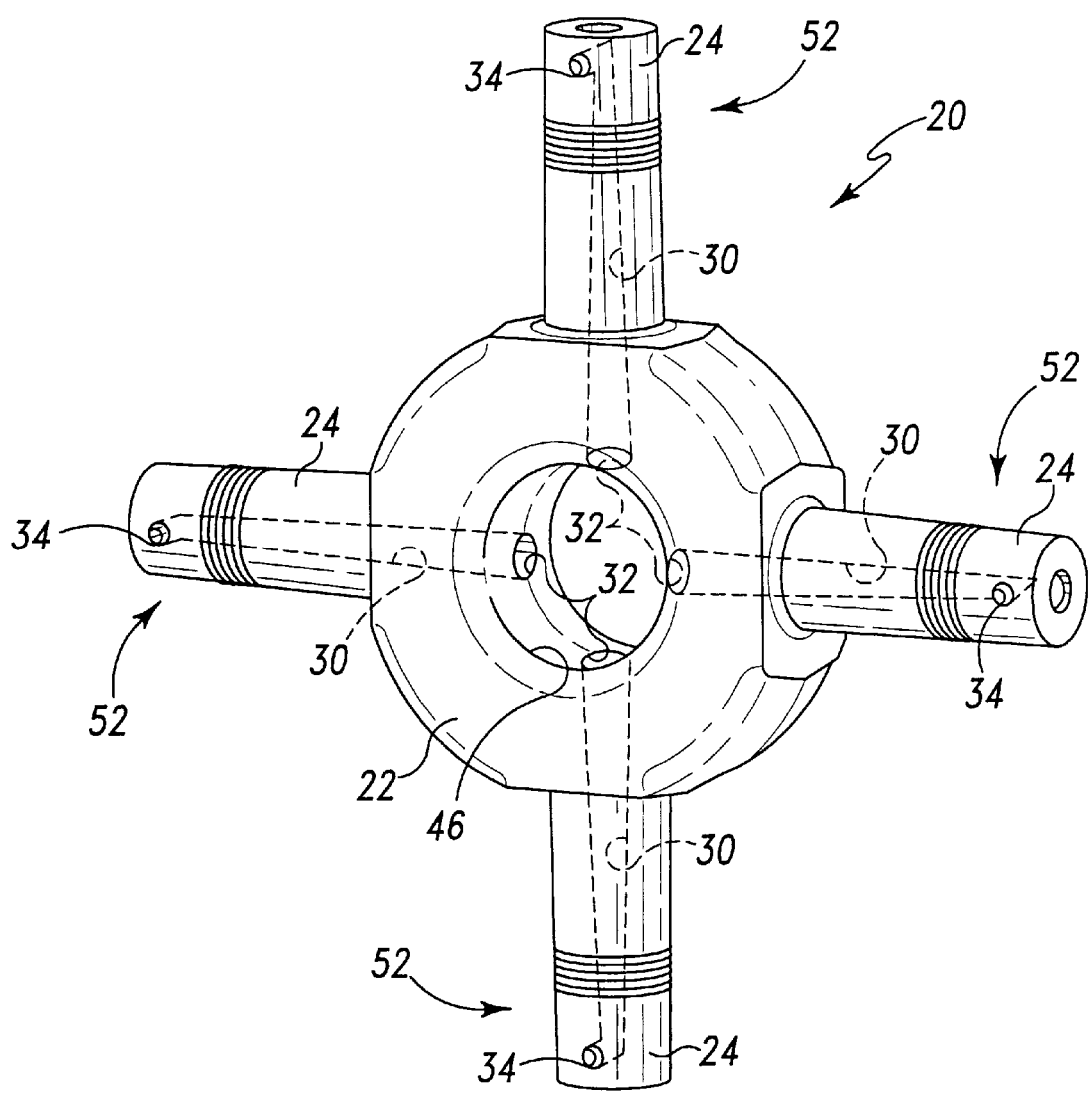
FIG. 2 is a perspective view of the spider structure of the differential assembly of FIG. 1.

Referring now to FIGS. 1 and 2, there is shown a differential assembly 10 which incorporates the features of the present invention therein. Differential assembly 10 is designed to be used in a work machine (not shown), such as a mining truck. Differential assembly 10 includes a differential housing 12, a spider structure 20, pinion gears 26, bearing assemblies 28, and a fluid pump 36. Differential assembly 10 also includes a heel bearing 48, side gears 54, and wheel axles 56.

Differential housing 12 defines an internal component chamber 14, a fluid housing inlet 16, and fluid housing outlets 18. Differential housing 12 also has a number of housing apertures 50 and a pair of axle passageways 62 defined therein. Heel bearing 48 is disposed around differential housing 12 adjacent to fluid housing outlets 18.

Each side gear 54 has an axle aperture 64 defined therein and is positioned in an opposing relationship within internal component chamber 14 of differential housing 12. In addition, each side gear 54 is positioned within internal component chamber 14 such that the axle aperture 64 defined in each side gear 54 is aligned with axle passageways 62. An end of one wheel axle 56 is positioned within the axle aperture 64 of each side gear 54 such that each wheel axle 56 is mechanically coupled to a side gear 54 (e.g. via a spline coupling).

Spider structure 20 has (i) a spider hub 22 with a central aperture 46 defined therethrough and (ii) a number of spider shafts 24 which extend from spider hub 22. Each spider shaft 24 has an end portion 52. In addition, spider structure 20 has a number of fluid spider channels 30 defined therein such that each fluid spider channel 30 extends through a spider shaft 24 and spider hub 22. Each fluid spider channel 30 has a fluid spider inlet 32 and a fluid spider outlet 34. Each fluid spider inlet 32 opens into central aperture 46 of spider hub 22.

Spider structure 20 is positioned within internal component chamber 14 such that spider structure 20 is interposed between side gears 54. Spider structure 20 is further positioned within internal component chamber 14 such that the end portion 52 of each spider shaft 24 is received in a housing aperture 50. It should be understood that positioning spider structure 20 in the above described manner locates each fluid spider outlet 34 within a housing aperture 50. It should also be understood that positioning each fluid spider outlet 34 within a housing aperture 50 places each fluid spider outlet 34 in fluid communication with a fluid housing outlet 18.

Each pinion gear 26 is positioned within internal component chamber 14 and disposed around a spider shaft 24 such that each pinion gear 26 meshingly engages a side gear 54. Moreover, each bearing assembly 28 is positioned within internal component chamber 14 and disposed around a spider shaft 24 such that bearing assembly 28 is interposed between spider shaft 24 and pinion gear 26.

Fluid pump 36 is in fluid communication with an oil reservoir 58 and fluid housing inlet 16 via an oil line 60.

Industrial Applicability

It should be appreciated that differential assembly 10 is incorporated into a work machine (not shown). In addition it should be appreciated that as the aforementioned work machine travels in a curved path (i.e. the work machine turns), differential housing 12 and spider structure 20 rotate around a central axis 40 in a direction indicated by arrow 42 via heel bearing 48 and a bearing 68. Note that differential housing 12 and spider structure 20 do not rotate relative to one another.

It should further be appreciated that fluid pump 36 continuously advances a flow of oil from oil reservoir 58 into fluid housing inlet 16 via oil line 60 during use of the work machine. The flow of oil advances through fluid housing inlet 16 in a direction indicated by arrow 38 until the flow of oil exits fluid housing inlet 16 and enters internal component chamber 14. Once the oil flow enters internal component chamber 14, the oil flow contacts and lubricates the components of differential assembly contained therein. For example, the oil flow contacts pinion gears 26, side gears 54, wheel axles 56, and bearing assemblies 28 before the flow of oil enters fluid spider inlet 32.

As differential housing 12 and spider structure 20 rotate around central axis 40 in the above described manner, a centrifugal force is imparted on the oil contained therein. The centrifugal force causes a toroid of oil to be formed within internal component chamber 14 of differential housing 12. However, it should be understood that the volume of oil continuously advanced into differential housing 12 by fluid pump 36 ensures that each fluid spider inlet 32 is submerged below the surface of the oil when the toroid is formed. Having each fluid spider inlet 32 submerged below the surface of the oil also ensures that fluid housing inlet 16 remains in fluid communication with each fluid spider inlet 32. In addition, having fluid spider inlets 32 submerged below the surface of the oil while spider structure 20 is rotated in the above described manner results in the centrifugal force and fluid pump 36 advancing the oil through fluid spider channels 30 in the directions indicated by arrows 66 (see FIG. 1; i.e. away from central aperture 46 of spider hub 22). As the oil is advanced in the directions indicated by arrows 66 the oil passes through each fluid spider outlet 34 and enters fluid housing outlet 18. The oil is then sprayed out of fluid housing outlet 18 such that the oil contacts and lubricates heel bearing 48. After contacting and lubricating heel bearing 48 the oil is returned back to oil reservoir 58.

It should be appreciated that the present invention ensures that all of the components of differential assembly 10 are continuously lubricated regardless of the centrifugal force imparted on the oil contained within differential housing 12. In fact, as discussed above, imparting a centrifugal force on the oil contained within differential housing 12 actually aids in the lubrication of the components of differential assembly 10. Thus, the present invention ensures that the components of differential assembly 10 are always lubricated. This is in contrast to other differential assemblies which depend upon a "splash lubrication" system since these types of systems, under certain conditions, allow the components contained within the differential housing to be run without an appropriate amount of lubrication.

In addition, the present invention eliminates the need for stationary lube jets to be positioned adjacent to various components (e.g. heel bearing 48) exterior to the differential housing. Eliminating the need for stationary lube jets decreasing the cost of manufacturing differential assembly 10 as compared to other differential assemblies which utilize stationary lube jets.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A differential assembly, comprising:
    a differential housing which defines an internal component chamber, said differential housing further defines a fluid housing inlet and a fluid housing outlet;
    a spider structure positioned within said internal component chamber, said spider structure has (i) a spider hub, and (ii) a spider shaft which extends from said spider hub;
    a pinion gear positioned within said internal component chamber and around said spider shaft; and
    a bearing assembly positioned within said internal component chamber, said bearing assembly being interposed between said pinion gear and said spider shaft, wherein (i) said spider structure has a fluid spider channel having a fluid spider inlet and a fluid spider outlet, (ii) said fluid housing inlet is in fluid communication with said fluid spider inlet, and (iii) said fluid spider outlet is in fluid communication with said fluid housing outlet.

2. The assembly of claim 1, further comprising a fluid pump which is positioned in fluid communication with said fluid housing inlet, wherein:

said fluid pump advances a flow of oil through said fluid housing inlet, said fluid spider inlet, said fluid spider outlet, and said fluid housing outlet, whereby oil is advanced through said internal component chamber so as to lubricate said pinion gear and said bearing assembly.

3. The assembly of claim 2, wherein:

said flow of oil is advanced into contact with said pinion gear and said bearing assembly after said flow of oil exits out of said fluid housing inlet and before said flow of oil enters said fluid spider inlet, whereby said pinion gear and said bearing assembly are lubricated by said oil.

4. The assembly of claim 1, wherein said fluid spider channel extends through both said spider shaft and said spider hub.

5. The assembly of claim 1, wherein:

said spider hub has a central aperture defined therethrough, and said fluid spider inlet opens into said central aperture.

6. The assembly of claim 1, further comprising a heel bearing which is positioned adjacent to said fluid housing outlet.

7. The assembly of claim 1, wherein:

said differential housing includes a housing aperture, an end portion of said spider shaft is received within said housing aperture, and said fluid spider outlet is positioned within said housing aperture.

8. The assembly of claim 2, wherein rotation of said spider structure causes oil located within said internal component chamber to advance through said fluid spider channel and away from said central aperture of said spider hub.

9. The assembly of claim 8, further comprising:

a side gear which (i) is positioned within said internal component chamber, and (ii) meshingly engages said pinion gear, and a wheel axle mechanically coupled to said side gear.

10. The assembly of claim 9, wherein:

said flow of oil is further advanced into contact with said side gear after said flow of oil exits out of said fluid housing inlet and before said flow of oil enters said fluid spider inlet, whereby said side gear is lubricated by said oil.

11. A differential assembly, comprising:

a differential housing which defines an internal component chamber, said differential housing further defines a fluid housing inlet and a fluid housing outlet;

a spider structure positioned within said internal component chamber, said spider structure has (i) a spider hub, and (ii) a spider shaft which extends from said spider hub;

a pinion gear positioned within said internal component chamber and around said spider shaft;

a bearing assembly positioned within said internal component chamber, said bearing assembly being interposed between said pinion gear and said spider shaft, wherein (i) said spider structure has a fluid spider channel having a fluid spider inlet and a fluid spider outlet, (ii) said fluid housing inlet is in fluid communication with said fluid spider inlet, and (iii) said fluid spider outlet is in fluid communication with said fluid housing outlet, and wherein a fluid pump advances a flow of oil through said fluid housing inlet, said fluid spider inlet, said fluid spider outlet, and said fluid housing outlet.

12. The assembly of claim 11, wherein:

said flow of oil is advanced into contact with said pinion gear and said bearing assembly after said flow of oil exits out of said fluid housing inlet and before said flow of oil enters said fluid spider inlet, whereby said pinion gear and said bearing assembly are lubricated by said oil.

13. The assembly of claim 11, wherein said fluid spider channel extends through both said spider shaft and said spider hub.

14. The assembly of claim 11, wherein:

said spider hub has a central aperture defined therethrough, and said fluid spider inlet opens into said central aperture.

15. The assembly of claim 11, further comprising a heel bearing which is positioned adjacent to said fluid housing outlet.

16. The assembly of claim 11, wherein:

said differential housing includes a housing aperture, an end portion of said spider shaft is received within said housing aperture, and said fluid spider outlet is positioned within said housing aperture.

17. The assembly of claim 11, wherein rotation of said spider structure causes oil located within said internal component chamber to advance through said fluid spider channel and away from said central aperture of said spider hub.

18. The assembly of claim 11, further comprising:

a side gear which (i) is positioned within said internal component chamber, and (ii) meshingly engages said pinion gear, and a wheel axle mechanically coupled to said side gear.

19. The assembly of claim 18, wherein:

said flow of oil is further advanced into contact with said side gear after said flow of oil exits out of said fluid housing inlet and before said flow of oil enters said fluid spider inlet, whereby said side gear is lubricated by said oil.

* * * * *